United States Patent
Rivers et al.

(10) Patent No.: US 11,726,974 B2
(45) Date of Patent: *Aug. 15, 2023

(54) DYNAMICALLY SELECTING AMONG LEARNED AND NON-LEARNED INDEXES FOR DATA ACCESS

(71) Applicant: Nasdaq, Inc., New York, NY (US)

(72) Inventors: Jonathan Rivers, Brighton, MA (US); Douglas Hamilton, Boston, MA (US); Leonid Rosenfeld, Brookline, MA (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,886

(22) Filed: Apr. 25, 2022

(65) Prior Publication Data

US 2022/0245116 A1     Aug. 4, 2022

Related U.S. Application Data

(63) Continuation of application No. 17/154,855, filed on Jan. 21, 2021, now Pat. No. 11,321,296.

(51) Int. Cl.
| | | |
|---|---|---|
| *G06F 16/22* | (2019.01) | |
| *G06N 3/08* | (2023.01) | |
| *G06F 16/248* | (2019.01) | |
| *G06F 16/28* | (2019.01) | |

(52) U.S. Cl.
CPC ........ *G06F 16/2272* (2019.01); *G06F 16/248* (2019.01); *G06F 16/285* (2019.01); *G06N 3/08* (2013.01)

(58) Field of Classification Search
CPC .. G06F 16/2272; G06F 16/285; G06F 16/248; G06N 3/08
USPC ........................................................ 707/741
See application file for complete search history.

(56) References Cited

U.S. PATENT DOCUMENTS

| | | | |
|---|---|---|---|
| 10,172,022 B1 * | 1/2019 | Wahlstrom | H04W 24/06 |
| 10,423,889 B2 * | 9/2019 | Phillipps | G06Q 10/04 |
| 2017/0236073 A1 * | 8/2017 | Borisyuk | G06Q 50/01 |
| | | | 706/12 |
| 2019/0204092 A1 * | 7/2019 | Wheeler | G05D 1/0246 |
| 2020/0086078 A1 * | 3/2020 | Poltorak | G16H 50/20 |

\* cited by examiner

*Primary Examiner* — Dung K Chau
(74) *Attorney, Agent, or Firm* — Nixon & Vanderhye, PC

(57) ABSTRACT

The described technology relates to systems and techniques for accessing a database by dynamically choosing an index from a plurality of indexes that includes at least one learned index and at least one non-learned index. The availability of learned and non-learned indexes for accessing the same database provides for flexibility in accessing the database, and the dynamic selection between learned indexes and non-learned indexes provide for choosing the index based on the underlying data in the database and the characteristics of the query. Certain example embodiments provide a learned model that accepts a set of features associated with the query as input, and outputs a set of evaluated weights for respective features, which are then processed according to a set of rules to predict the most efficient index to be used.

20 Claims, 16 Drawing Sheets

| Feature | Input Value | Output Weight |
|---|---|---|
| Avg. chunk size | 8 MB | 0.1 |
| Std. dev. chunk size | +- 5 MB | 0.3 |
| Num. chunks | 200 | 0 |
| Retrieval time | 10 ms | 0 |
| Tot. data scanned | 1 TB | 0 |
| Density/Sparsity factor | 0.1 | 0.6 |

FIGURE 6

| | geolocation_zip_code_prefix |
|---|---|
| count | 18015.000000 |
| mean | 52.599693 |
| std | 72.057907 |
| min | 1.000000 |
| 25% | 10.000000 |
| 50% | 29.000000 |
| 75% | 66.500000 |
| max | 1146.000000 |

Fig. 9A

| | | | | | | | | |
|---|---|---|---|---|---|---|---|---|
| 31 | 16 | 300 | 0.6 | 20054 | 1 | 1 | 13 | 0 | Rect |
| 28 | 56 | 456 | 0.9 | 67554 | 1 | 1 | 17 | 1 | Rect |
| 27 | 34 | 324 | 0.2 | 3876 | 2 | 2 | 2 | 2 | Rect |

Fig. 9D

```
# An example of using an SVM to do the features prediction with just a few lines of the above data.
from sklearn import svm X = [[15, 300, 0.6, 20084, 1, 1, 13, -27.8546024, -82.30494629, -29.8546024, -53.30494629, [86, 45
6, 0.9, 67384, 1, 1, 17, -29.8546024, -53.30494629, -24.8546029]]
y = [31, 28]
regr = svm.SVR()
regr.fit(X, y)
elapsed = regr.predict([[10, 0, 0, 0, 0, 0, 0, -26.8546024, -82.30494629, -29.8546024, -56.30494629,
]])

# The function outputs the predicted elapsed time of the new query entered with all of it's query fea
tures.

latency_prediction_system_A = 42.5 # An estimate for a postgres system.
latency_prediction_system_B = elapsed[0]
multiplier = 10
if latency_prediction_system_B * multiplier <= latency_prediction_system_A:
    print("Execute with system B")
else:
    print("Execute with system A")
# SVM predicts elapsed runtime and then comparison selects index for new query.
```

Fig. 9E

```
scaler_model = MinMaxScaler()
scaler_model.fit(X_train)

X_train=pd.DataFrame(scaler_model.transform(X_train),columns=X_train.columns,index=X_train.index)

scaler_model.fit(X_eval)

X_eval=pd.DataFrame(scaler_model.transform(X_eval),columns=X_eval.columns,index=X_eval.index)

#The estimator model
model=tf.estimator.DNNRegressor(hidden_units=[6,10,6],feature_columns=feat_cols)

#the input function
input_func=tf.estimator.inputs.pandas_input_fn(x=X_train,y=y_train['elapsed'],batch_size=10,num_epochs=1000,shuffle=True)

#Training the model
model.train(input_fn=input_func,steps=1000)

#Evaluating the model
train_metrics=model.evaluate(input_fn=input_func,steps=1000)
```

Fig. 9F

```
#Now to predict values we do the following
pred_input_func=tf.estimator.inputs.pandas_input_fn(x=X_eval,y=y_eval,batch_size=10,num_epochs=1,shuf
fle=False)
preds=model.predict(input_fn=pred_input_func)

predictions=list(preds)
final_pred=[]
for pred in predictions:
    final_pred.append(pred("predictions"))

latency_prediction_system_A = 10e-3 # An estimate for a postgres system.
latency_prediction_system_B = final_pred[0]*10e-3
multiplier = 10
if latency_prediction_system_B * multiplier <= latency_prediction_system_A:
    print("Execute with system B")
else:
    print("Execute with system A")
```

DYNAMICALLY SELECTING AMONG LEARNED AND NON-LEARNED INDEXES FOR DATA ACCESS

CROSS REFERENCE(S) TO RELATED APPLICATION(S)

This application claims priority from U.S. application Ser. No. 17/154,855 filed on Jan. 21, 2021, the entire contents of which is herein incorporated by reference.

TECHNICAL OVERVIEW

The technology described herein relates to database access, and more particularly to indexes for database access.

BACKGROUND

Database access has for long been an area of great interest and challenge in computer systems in numerous application areas. With the continued rapid growth of digitization, interconnectivity and processing capabilities of computers, the size of databases keep growing and the types of information stored in databases also keep expanding. With the popularity of machine learning and other advanced data analysis techniques for various applications, database access continues to grow in importance.

Indexes are a key aspect of making large databases accessible. An index allows the underlying data in the database to be physically and/or logically arranged in relation to one or more keys, and to be accessed efficiently in accordance with specified key values. Many indexing techniques are known and are commonly used in database systems. In conventional database systems, it is common to have multiple indexes each providing efficient access based on respectively different keys or key combinations. Identifying the most appropriate key or keys for accessing a database, and using the most appropriate index for accessing the database using the identified keys are important for many database-related applications.

As the data stored in the database gets more and more varied and voluminous, and as the needs for accessing that data becomes more demanding, improved techniques and systems continue to be desired.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to systems and techniques for accessing a database by dynamically choosing an index from a plurality of indexes that includes at least one learned index and at least one non-learned index. The availability of learned and non-learned indexes for accessing the same database provides for flexibility in accessing the database, and the dynamic selection between learned indexes and non-learned indexes provide for choosing the index based on the underlying data in the database and the characteristics of the query. Certain example embodiments provide a learned model that accepts a set of features associated with the query as input, and outputs a set of evaluated weights for respective features, which are then processed according to a set of rules to predict the most efficient index to be used. In certain other example embodiments, the learned model is configured to output the prediction of the most efficient index for the query.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 6 illustrates a table showing example features, example input values to the model, and example output weights calculated by the model according to some example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Query performance prediction can be very difficult, as the latency of a query is highly dependent on a number of factors, such as, for example, the chosen execution plan, the underlying data distribution, and the resource availability. As database management systems and their supported applications become increasingly complex, query performance prediction only gets more difficult due, for example, to the wide diversity of applications, which often leads to variable and complex query plans. Additionally, new query operators (and their new physical implementations) can introduce novel and complex interactions with the rest of the operators in a plan.

The technology described herein relates to, among other subjects, improving the performance of a database system by increasing the efficiency of access to the data by queries. More particularly, according to some example embodiments, dynamic selection between learned indexes and non-learned indexes is performed before accessing data in a database in order to improve the efficiency of data access. In some embodiments, the selection is based upon a set of features that apply to the query and the data.

The inventors propose a dynamic and adaptive technique to select, on a per query basis in some embodiments, the most efficient index from among a set of indexes that includes one or more learned indexes and one or more non-learned (also referred to as traditional) indexes. The dynamic and adaptive nature of the technique provides for efficient data access even when the data and/or the queries change.

In some embodiments, a computer system is provided for capturing the multi-dimensional sparse and dense model structure of a data set (e.g., financial market data) and for systematic analysis. At least one threshold is provided for selecting data indexing based on the structure and/or distribution of the data and the workload associated with a particular query. The model is able to estimate the difficulty in, or the costs associated with, accessing the data and select the appropriate access method.

Figure 1:
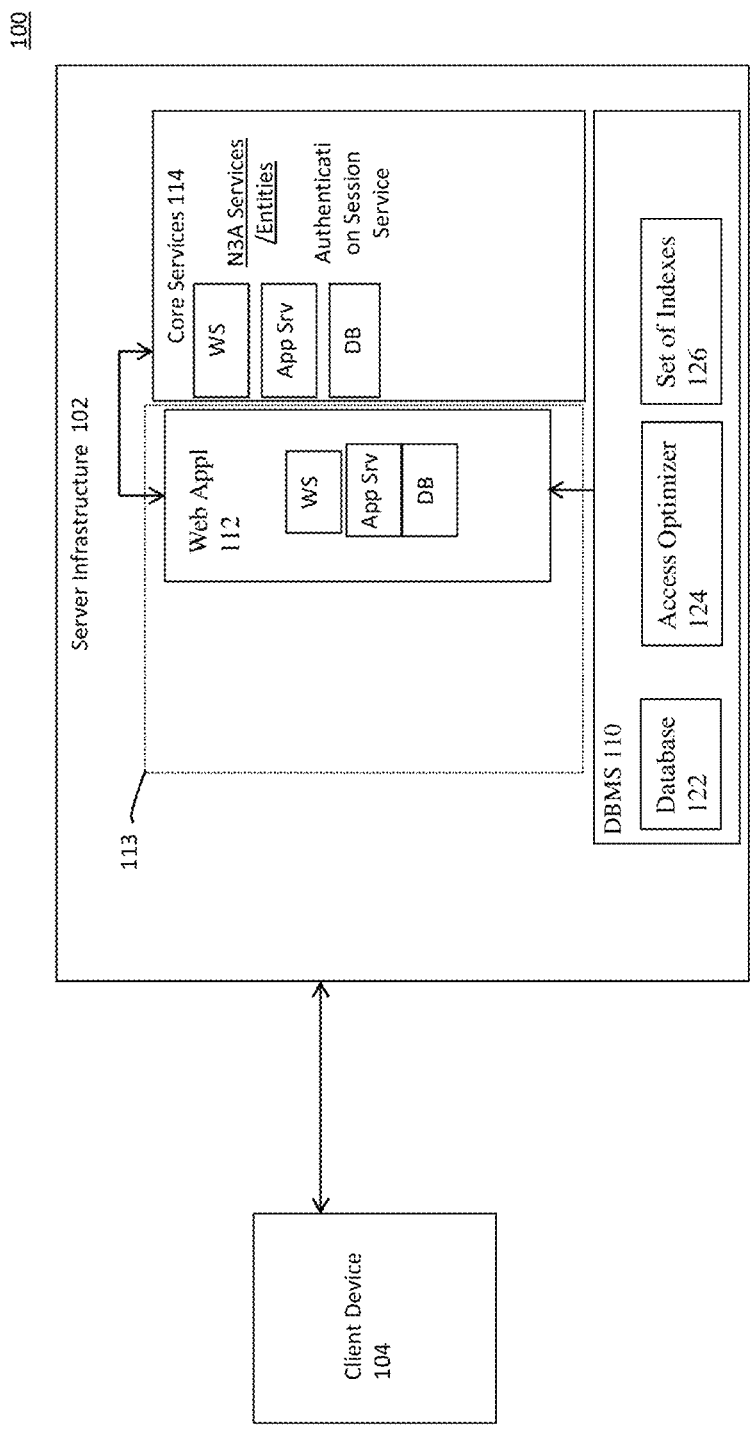
FIG. 1 illustrates an example computing environment in which dynamic selection between learned indexes and non-learned indexes is performed before accessing data in a database in order to improve the efficiency of data access, according to some example embodiments.
Figure 2:
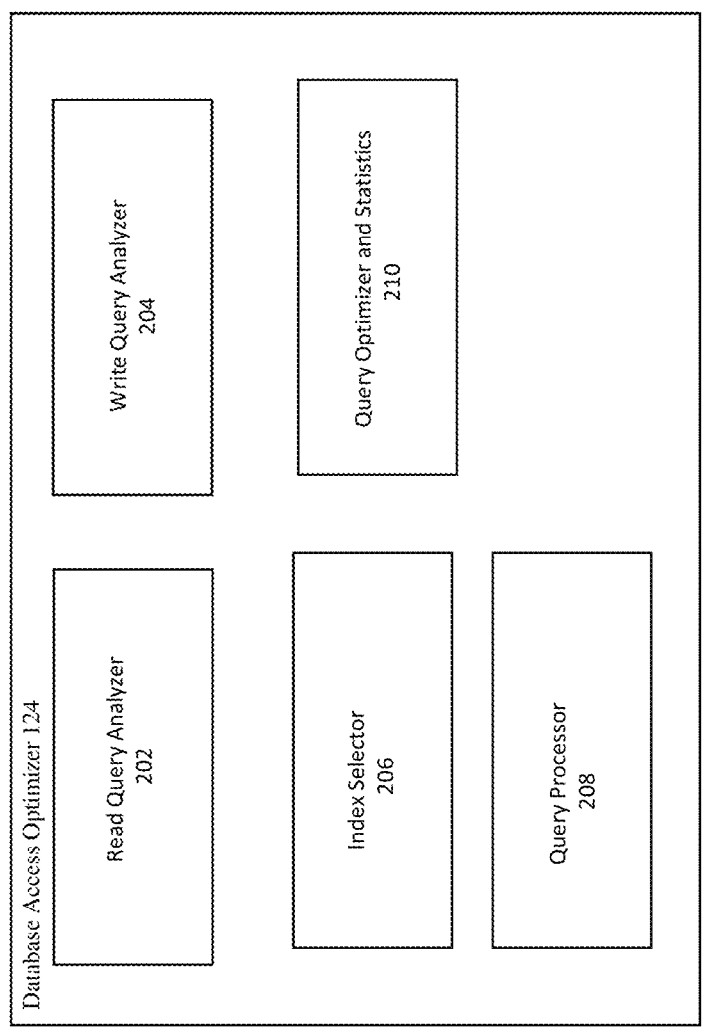
FIG. 2 illustrates a database access optimizer that performs the dynamic selection between learned indexes and non-learned indexes, according to some example embodiments.
Figure 3:
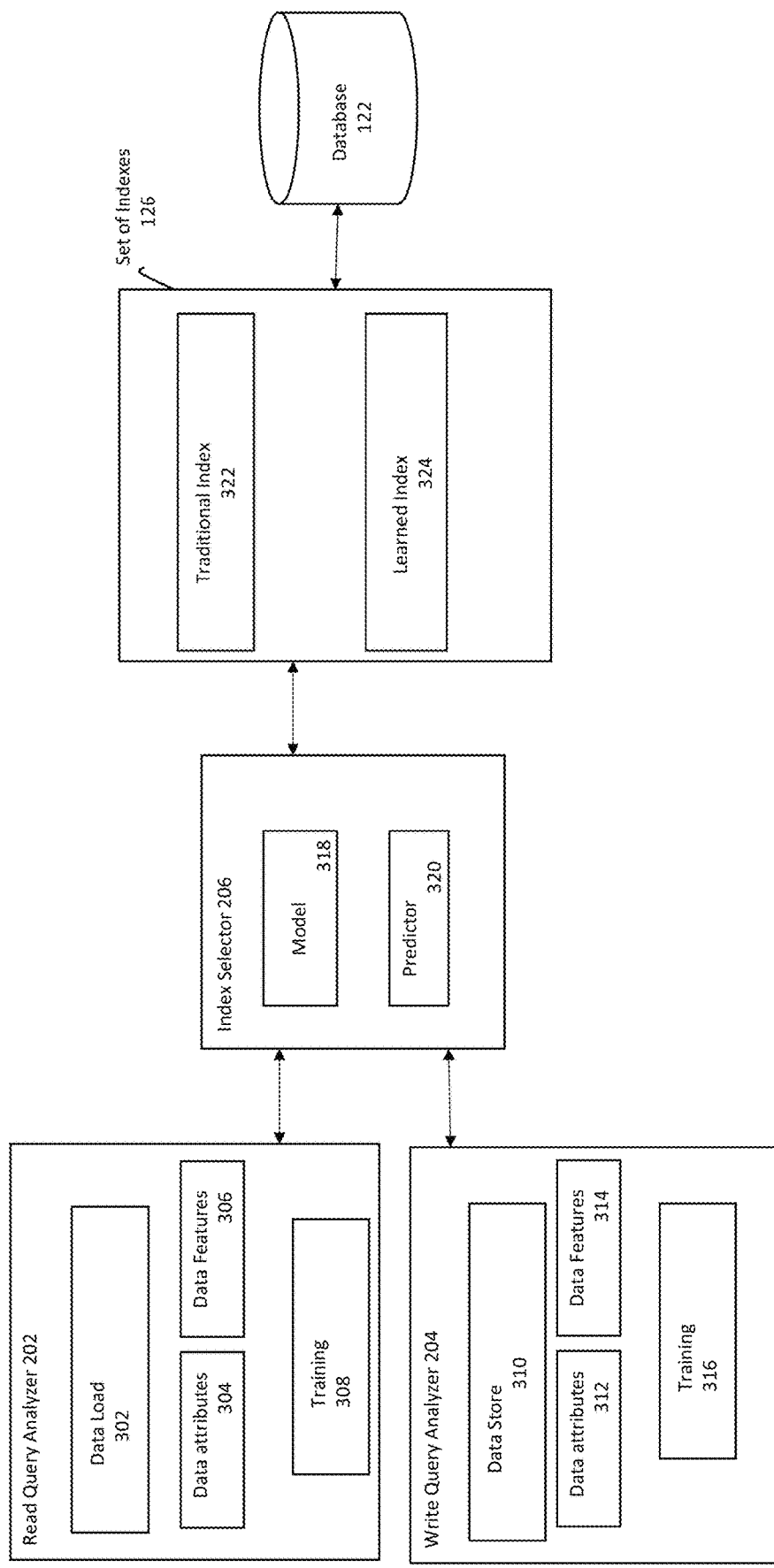
FIG. 3 schematically illustrates the relationship between some components of the database access optimizer, a plurality of indexes and the database, according to some example embodiments.
Figure 4:
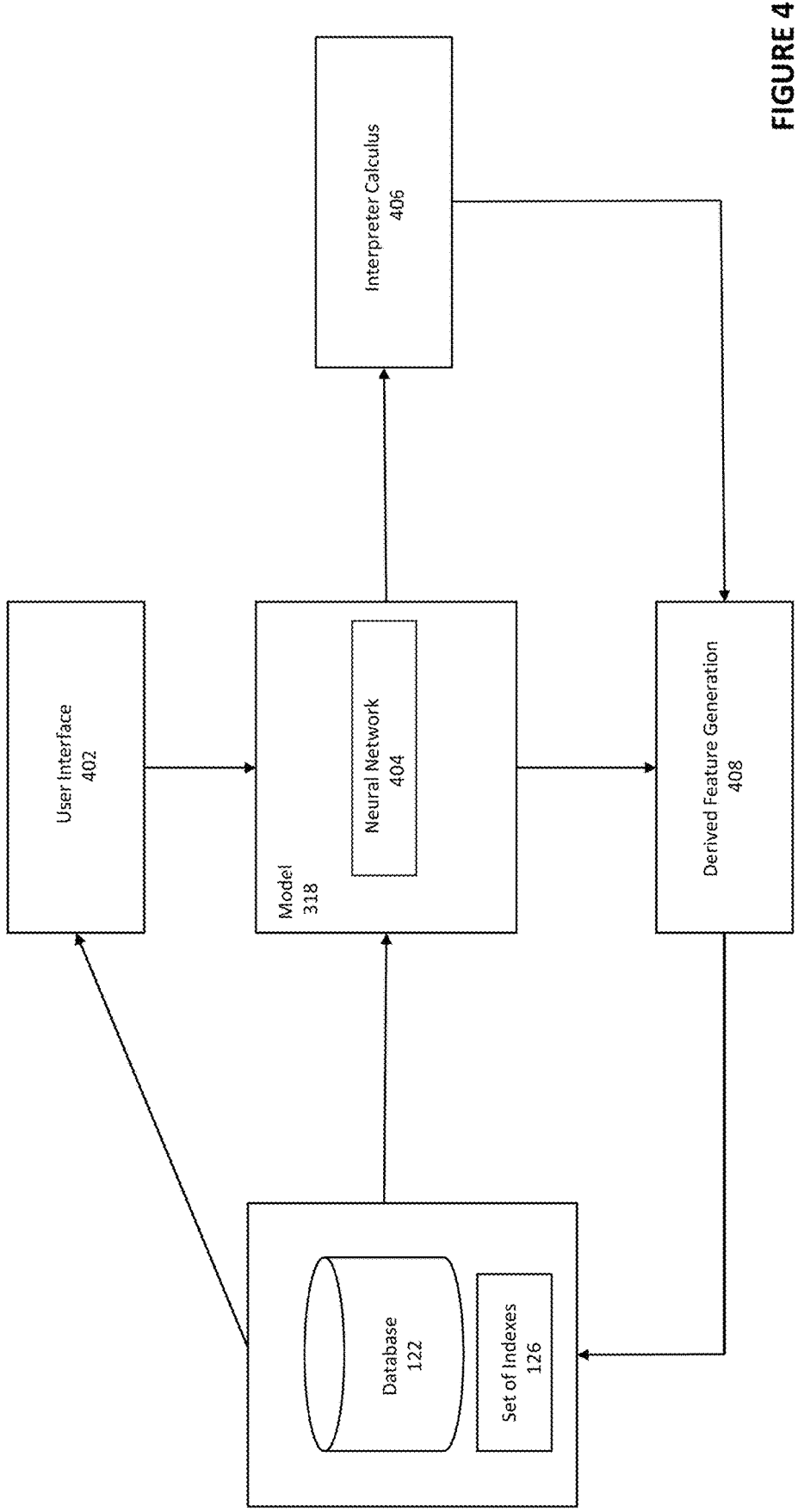
FIG. 4 illustrates an example relationship between the database and a learned model, according to some example embodiments.
Figure 5:
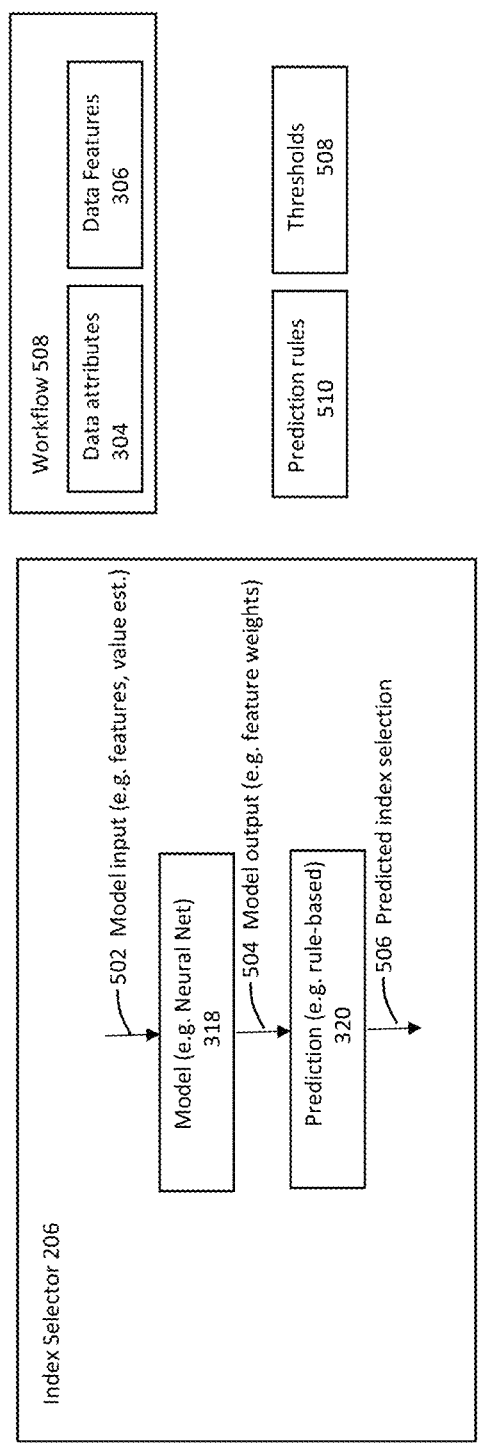
FIG. 5 illustrates an index selector component of the database access optimizer shown in FIG. 2, according to some example embodiments.
Figure 7:
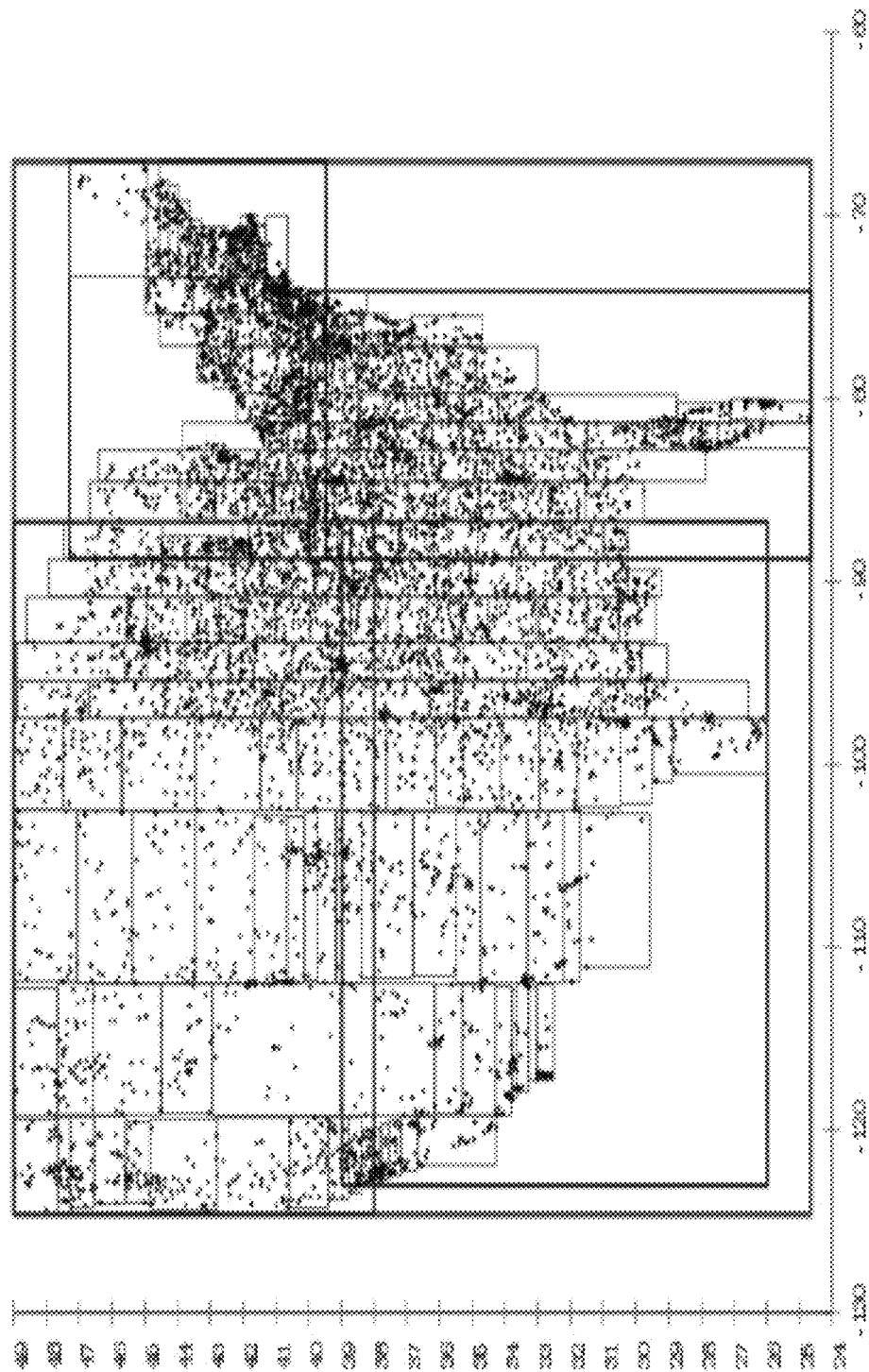
FIG. 7 graphically illustrates the data distribution represented in an example dataset stored in the database, and example grouping of the dataset into chunks, according to some example embodiments.
Figure 8:
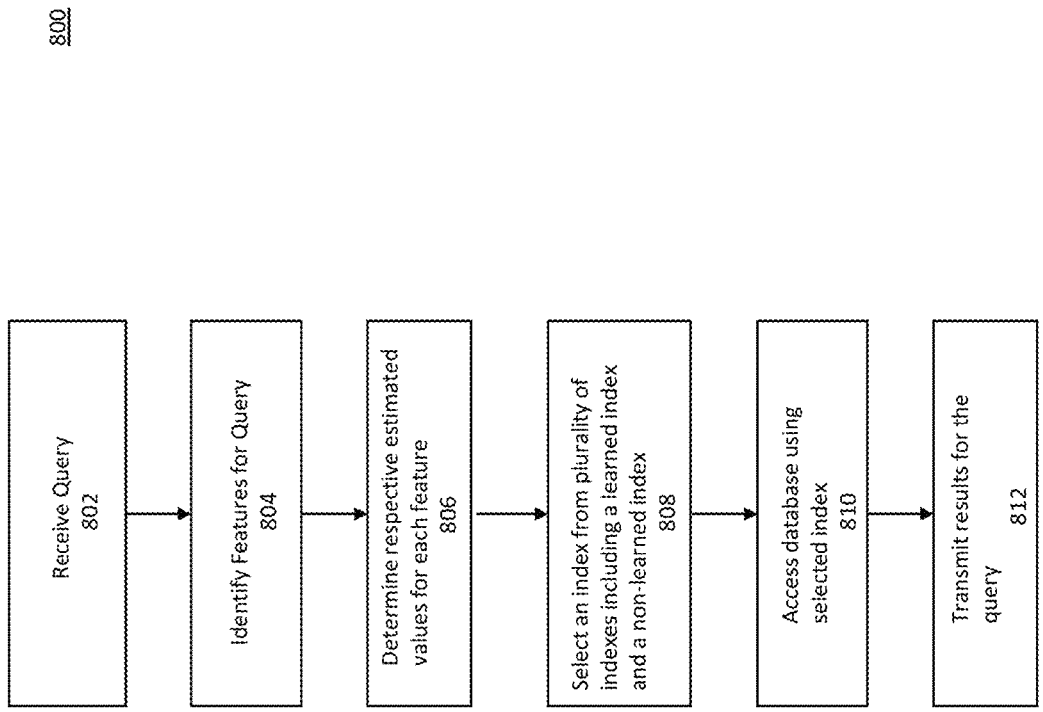
FIG. 8 illustrates a process for providing dynamic selection between learned indexes and non-learned indexes is performed before accessing data in a database in order to improve the efficiency of data access, according to some example embodiments.
Figure 9B:
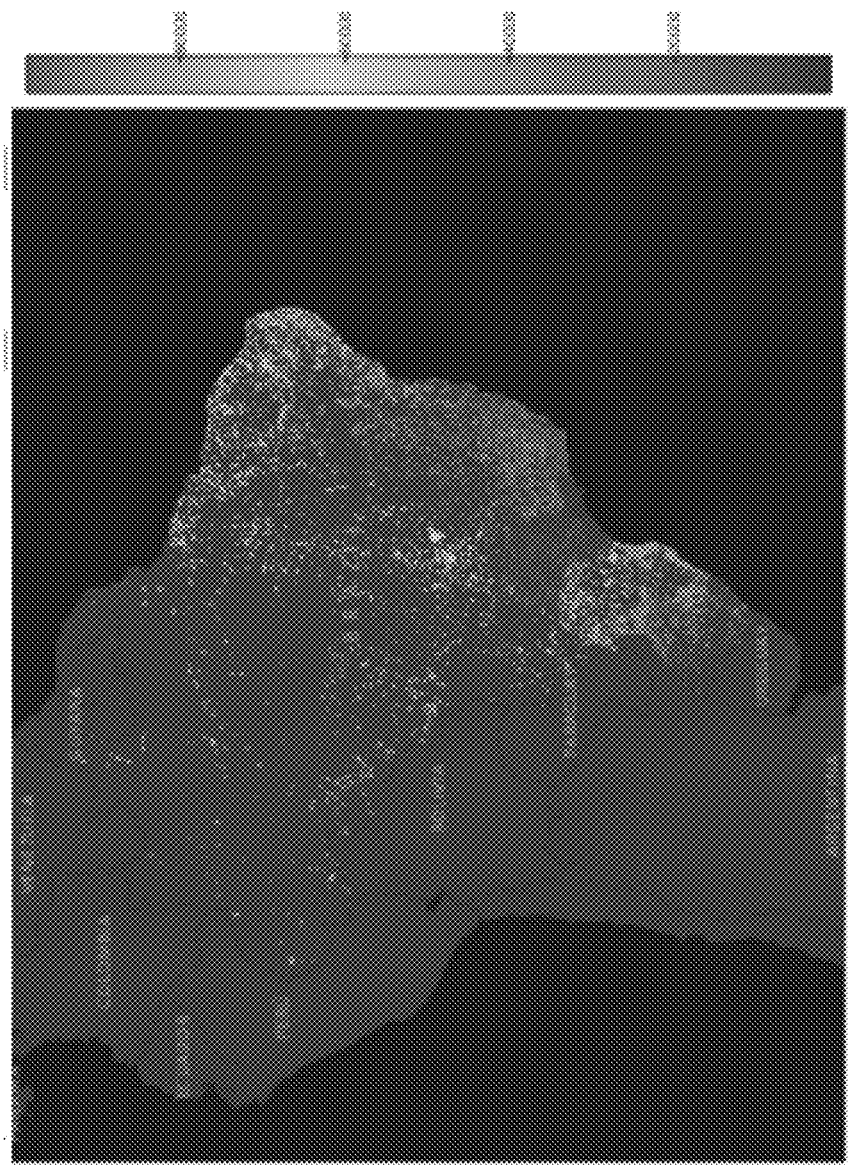
FIG. 9 (FIGS. 9A-9G) illustrates an example dataset and associated in accordance with an embodiment.
Figure 9C:
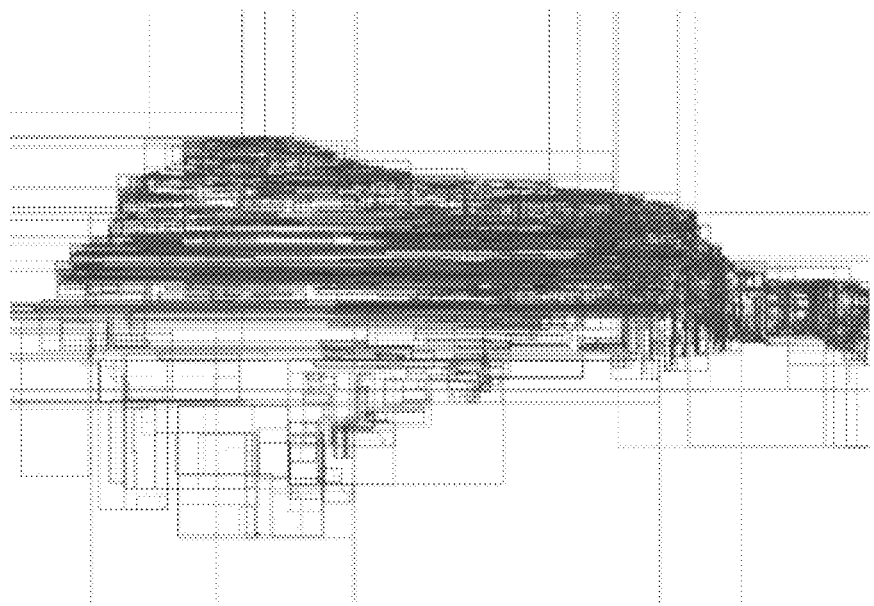
Figure 10:
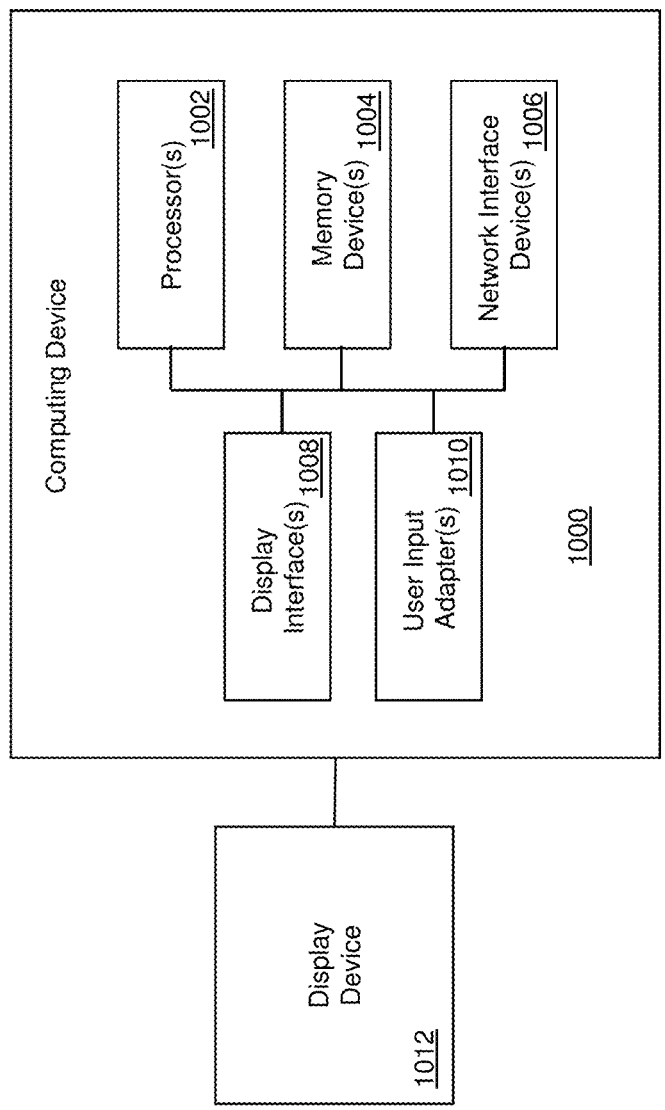
FIG. 10 schematically illustrates a computer that can be used to implement the dynamic index selection and framework, according to some example embodiments.

FIG. 1 illustrates a computing environment according to some example embodiments in which dynamic selection between learned/non-learned indexes is performed before accessing data in a database in order to improve the efficiency of data access; some of the components of the computing environment shown in FIG. 1 include a database access optimizer, a set of indexes, and a database. FIG. 2 illustrates some example components of the database access optimizer of FIG. 1, including an index selector that is a component of the database access optimizer. FIG. 3 shows further details of some of the components of the database access optimizer shown in FIG. 2, (including an index selection model and a predictor that are component of the index selector), and also schematically illustrates relationships between database access optimizer components, the indexes and the database of FIG. 1. FIG. 4 relates to the training of the index selection model shown in FIG. 3. FIG. 5 shows further details regarding the index selector shown in FIG. 2 and FIG. 3, including further details regarding the index selection model and predictor. As shown, in some embodiments, the index selection model may include a neural network. FIG. 6 illustrates a table showing example features representing inputs to the index selection model, example input values for the respective features and example output weights for the respective features as determined by the index selection model; in an example embodiment, features, such as those shown in FIG. 6, are provided as input to the index selection model shown in FIG. 5 with the corresponding values for respective features. The example weights may represent weights calculated for each feature by the index selection model shown in FIG. 5. FIG. 7 graphically illustrates the data distribution represented in an example dataset stored in the database of FIG. 1, and example grouping of the dataset into "chunks" which are indexed by a learned index. FIG. 8 illustrates a process for providing dynamic selection between learned/non-learned indexes is performed before accessing data in a database in order to improve the efficiency of data access; this process may be performed in the computing environment shown in FIG. 1. FIG. 9 illustrates, or more specifically FIGS. 9A-9G illustrate, characteristics of an example electronic commerce dataset and an example application of aspects of the process shown in FIG. 8 to the example dataset. FIG. 10 schematically illustrates an example computing device that can be used, according to some embodiments, to implement the features described with reference to FIG. 1 through FIG. 9.

Some of the embodiments described in detail relate to electronic trading and/or securities analysis. However, although such applications may use the teachings in this disclosure with particular advantage to speed up data access, embodiments are not limited to such environments or applications.

Description of FIG. 1

FIG. 1 illustrates a computing environment in accordance with certain example embodiments. The non-limiting computing environment 100 includes an electronic data access system which provides for securities and/or document analysis and which may be operated in connection with an electronic trading system, and client systems that connect to the analysis system and/or electronic trading system.

The electronic data access system includes one or more servers 113, 114 in server infrastructure 102. Server infrastructure 102 may include one or more interconnected servers serving an organization. One or more servers 113 may service user requests received from client devices, such as client device 104. The one or more servers 113 host a web application 112. The web application 112 includes a server-side portion being executed on the one or more servers 113, and may also have a client-side portion executing on a client device 104. The web application 112 may, for example, be a securities and/or document analysis application. In some embodiments, the analysis application may operate in association with an electronic trading application.

One or more servers 114 may be configured for backend services. The backend services includes, for example, authentication, user configurations, security, credentials etc. The backend services may also provide for user and/or application session maintenance and the like.

The server infrastructure 102 also includes a database management system (DBMS) 110. The DMBS 110 includes one or more databases 122, and may store and provide access to securities information. In some embodiments, the stored securities information is based on documents, such as, but not limited to, documents submitted by various corporations to the securities regulators and/or made publically-available. The documents may be accessed by various keys, such as, for example, title, document ID, author, tokens obtained from tokenizing at least parts of respective documents, publishing date, publishing source, etc. The database 122 may reside in one or more memory devices including one or more non-volatile memories and/or one or more volatile memories.

The DBMS 110 also includes a plurality of indexes 126 that provide for accessing the underlying database based on different keys or key combinations. The plurality of indexes includes at least one learned index and at least one non-learned index. "Learned indexes", as the term is used in this disclosure, refer to indexes that are created and/or maintained using machine learning techniques such as deep learning. For example, a learned index may include a neural network that is trained to take one or more key values as input and output a predicted location of the corresponding record in the database. "Non-learned indexes" refer to indexes that do not require or use machine learning (e.g. do not use deep learning) to form or maintain the index structures. Examples of non-learned indexes include B-tree indexes, hash-map indexes, and Bloom filter indexes.

The DBMS 110 in addition, also includes a database access optimizer 124. The database access optimizer 124 provides for selecting an index from the plurality of indexes in accordance with characteristics of the query to be run on the database and/or characteristics of the data to be retrieved in response to the query. The database access optimizer 124, at least in some embodiments, is configured to select the index that is considered to be most efficient in terms of access times or the like for a particular read query or write query. In particular, the database access optimizer 124 may dynamically consider each received query in terms the structure of the data to be accessed and/or the workload for that query in order to make a respective selection of an index for that query. The selection of the index may be based on a known criteria. For example, in some instances, the known criteria may be directed to identifying the index that is predicted to yield the fastest response to the query. In some other embodiments, the known criteria may be directed to reducing the amount of data retrieved from the database memories, or a combination of reducing the time and reducing the amount of data retrieved from memory.

In some embodiments, the server infrastructure 102, utilizing backend services, may also interact with one or more external servers, such as, for example, for receiving streamed or downloaded documents, securities and/or trading information. Server infrastructure 102 may include one or more physical server computers (e.g., servers 113, 114) that are communicatively connected to each other over a network and/or point-to-point connections. The physical server computers may be geographically co-located or distributed. The interconnection between servers in server infrastructure 102 may be via the Internet or over some other network such as a local area network, a wide area network or point-to-point connections (not separately shown) with each other. In some embodiments, multiple servers are interconnected with high speed point-to-point connections and/or a high speed broadcast bus. Each server 113, 114 includes a processing system having at least one uni- or multi-core processor and includes system software. In some embodiments, each server 113, 114 may correspond to a processing unit in a Symmetric Multiprocessor (SMP). In some embodiments, each server 113, 114 may be standalone computer interconnected to one or more other computers with a high speed connection. In some embodiments, a server 113 or 114 corresponds to a server process running on one or more physical computers.

An application, such as any on server 113, may comprise one or more client-side components and one or more server-side components. Client-side components of an application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Client devices 104 may include any of personal computers, mobile computers, tablets, smartphones, and other electronic devices. In some example embodiments, any electronic computing device including at least a display, an input device for user input, and a communication interface for communicating with the server device may operate as a client device.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 10, as well as elsewhere in this document.

In many places in this document, including, but not limited to, in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 10.

Description of FIG. 2

FIG. 2 illustrates a database access optimizer, such as, for example, the database access optimizer 124 shown in FIG. 1, according to some embodiments. The database access optimizer 124 performs the dynamic selection of an index from a plurality of indexes for incoming read queries and write queries. The plurality of indexes includes one or more learned indexes and one or more non-learned indexes. The dynamic selection of an index may be performed for each query, or for a group of queries. According to some example embodiments, the database access optimizer 124 makes the selection by considering at least one learned index and at least one non-learned index.

The database access optimizer 124 comprises a read query analyzer 202, a write query analyzer 204, an index selector 206, a query processor 208, and a query optimizer and statistics module 210.

The read query analyzer 202 and the write query analyzer 204, each analyzes a respective received query, identifies at least some of the relevant data attributes (e.g., data fields of records in a database table) and at least some of the data features (e.g., characteristics of one or more of the data items) associated with the query. A data feature may be a characteristic, such as, for example, an aspect of the distribution of a data attribute. Some example features are described in relation to FIG. 6. The read query analyzer 202 analyzes read queries (also referred to as "load queries"), and the write query analyzer 204 analyzes write queries (also referred to as "store queries"). The analysis may also include one or more other functions in addition to identifying a set of relevant data attributes and/or a set of relevant features.

The index selector 206 operates to select an index to be used for accessing the database to execute the incoming query. That is, according to some embodiments, the index selector 206 selects one of the indexes to be used in accessing the database in responding to the incoming query. In some embodiments, the index selector 206 may select more than one index for responding to the incoming query. The index selector 206 performs the selection using the features of one or more data attributes identified by (or is derivable from) the query during operation of read query analyzer 202 and/or the write query analyzer 204. The index selector 206 may also consider certain features of one or more data attributes of the data in the database in making the selection.

The query processor 208 operates to perform the query on the database. The query optimizer and statistics module 210 receives the query from a user or other entity via a user interface, converts the received query to a form that can be processed by the database, and generates a query execution plan. The query processor 208 obtains the query execution plan from the query optimizer and statistics 210, and executes the query to obtain the data from the database according to the query plan.

The query, as received by the query optimizer and statistics module 210, can be in the syntax of a high level query language such as SQL (also known as "Structured Query Language"). The query optimizer and statistics module 210 may parse the received query and translate it to a syntax and form that can be used by the DBMS for further processing. This process may include tokenizing the received query, forming a query tree based on the determined tokens, generating a query execution plan. The operations of tokenizing and forming a query tree (e.g. relation algebra expression(s), relation tree and/or graph representation of the query) may be performed in multiple iterations to determine a suitable (e.g. an optimal according to one or more predetermined criteria) execution plan.

The query optimizer and statistics module 210 may process the query tree to represent the query in terms of structures used by the database which may be the most efficient and/or most capable. These structures may be chosen based on any one or more of the mappings between the tables, joins used, and the cost of execution of the query or parts thereof. The query processor 208 determines the structure which is most efficient for processing, type of filters and/or when to apply filters etc. Based on these, the query processor selects the execution plan to be used.

When the query is executed according to the selected execution plan, database records are retrieved from memory in accordance with the plan. In some embodiments, a received query or part thereof, in the executable form or in an intermediate form, may be stored in the DBMS for execution subsequent execution as separate queries or parts of other queries. Upon executing the query according to the selected execution plan, the result is returned to the requesting device and/or user.

According to some embodiments, the cost associated with running the query received is the time taken for the query to access the database and return the result. It includes the time taken to parse and/or translate the query, to optimize the query, to evaluate the query, to execute the query and to return the result to the user. Executing the optimized query includes accessing the database records in the memory in accordance with one or more indexes, and thus, the cost of the query may vary for different indexes. The memory that is accessed for the query may be only the primary memory of the database (e.g. random access memory, read only memory), or may also include access to secondary memory (e.g. virtual memory). When database record access includes accessing secondary memory, the majority of memory access time is involved in accessing that secondary memory (e.g. the time for disk I/O) and returning the result. The time to access the secondary memory includes the seek time (e.g., time for the processor locate the database records in memory in accordance with an index and the file organization) and the transfer time (e.g., the time for the disk to return the results to the processor or user). Even when accessing primary memory or secondary memory, the cost may differ between queries due the amount of data accessed/retrieved and the number of memory blocks (or other quantum of memory accessible/retrievable on a single request) being different between the queries. Although in some embodiments, CPU time, primary memory access time etc. too may be considered as components of the cost of the query, in some embodiments the only the cost of accessing secondary memory is considered because the other costs are small (and therefore can be safely ignored from consideration) in comparison to the secondary memory access cost.

In some embodiments, the cost may also include one or more of a volume of data retrieved from the database in order to form the result to be returned for the query, volume of data returned in the result, a ratio of the volume of data returned with the result to a total volume of data retrieved from memory, number of blocks retrieved from memory, or ratio of volume of data returned with the result to the number of blocks retrieved from memory.

The index used, and the file organization of the database can have a substantial effect on the seek time and also the retrieval time. There are many types of indexes, each providing different access characteristics. Dense indexes, include an entry in the index for each record and therefore the seek time is the time to locate the entry in the index and the time to directly access the corresponding record in the memory. Sparse indexes have an entry in the index per block of records in the memory, and therefore, yield a seek time consisting of the time to access the entry in the index, the time to access the corresponding block in memory, and the time to search for the record in the block.

B-tree indexes are a type of indexes that have been found to be efficient for range queries that, for example, require returning all records satisfying certain range of values for one or more data fields of the records. Hash-map indexes are known to be efficient for key-based lookup of a database.

The query optimizer and statistics module 210 operates to determine an execution plan for a query. The query optimizer 210 can, in some embodiments, evaluate the relational expression of the query and evaluate execution plans, thereby determining the most efficient execution plan for the incoming query. The execution plan is then provided to the query processor 208. As described above, the query processor executes the query on the database in accordance with the execution plan and returns the result.

Description of FIG. 3

FIG. 3 schematically illustrates the relationship between some components of the database access optimizer, a plurality of indexes and the database, according to some example embodiments. FIG. 3 illustrates further details of some of the components shown in FIG. 2, and the database 122.

The read query analyzer 202 includes a data load component 302, a set of data attributes 304, a set of data features 306, and a training component 308. The data load component 302 may receive and control the analysis of a read query (also referred to as a "load query"). The analysis may include parsing the query to identify the data attributes 304 to be read and the data features 306 associated with the query. The analysis may utilize the query processor 208 for parsing the query. The parsing, among other things, determines the set of data attributes 304 for the query. The analysis process may also identify the data and/or the database that will be accessed by the query. The analysis may also determine a set of data features 306 that are deemed most relevant to the query. The set of data features 306 considered for the query may be chosen from a collection of data features that has been previously determined for the data and/or database to be accessed by the query. The analysis may also assign an estimated value to one or more features in the set of features 306.

The training component 308 may operate to train the index selection model(s) based on the received read queries and responses to those queries. For each query, the training component 308 may store, in a training data set for use in subsequently training the index selection model(s), query characteristics such as the set of data attributes, determined set of data features and associated values (e.g., values of data attributes and estimated values for the data features), and also performance parameters for the query. The performance parameters are determined based on the result obtained for the query.

The write query analyzer 204 includes a data query component 310, a set of data attributes 312, a set of data features 314, and training component 316. The data store component 304 may receive and control the analysis of a write query (also referred to as a "store query"). The analysis may include parsing the query to identify the data attributes 312 to be read and the data features 314 associated with the query. The analysis may utilize the query processor 208 for parsing the query. The parsing, among other things, determines the set of data attributes 312 for the query. The analysis process may also identify the data and/or the database that will be accessed by the query. The analysis may also determine a set of data features 314 that are deemed most relevant to the query. The set of data features 314 considered for the query may be chosen from a collection of data features that has been previously determined for the data and/or database to be accessed by the query. The analysis may also assign an estimated value to one or more features in the set of features 314. The estimated values may be assigned by query analyzers 202 and 204 to respective data features in accordance with characteristics of the data to be accessed by a particular query and/or characteristics of the particular query. Example characteristics may include the characteristics of the distribution of data in the database, data access latencies, size of units of access, and the like. Example characteristics of queries may include the set of attributes, query performance characteristics, and the like. Preconfigured values, historical values (e.g., based on previously run same or similar queries and/or same or similar data features), dynamically determined values (e.g., based upon real-time evaluation of the query by the query analyzer), or a combination thereof may be used in determining the respective estimated values.

The training component 316 may operate to train the index selection model(s) based on the received write queries and responses to those queries. For each query, the training component 316 may store, in a training data set for use in subsequently training the index selection model(s), query characteristics such as, for example, the set of data attributes, determined set of data features and associated values (e.g., values of data attributes and/or estimated values for the data features), and also performance parameters for the query. The performance parameters (e.g., latency, size of data returned, etc.) are determined based on the result obtained for the query.

The set of indexes 126 includes one or more traditional indexes 322 and one or more learned indexes 324. The one or more traditional indexes 322 includes one or more indexes that are not based on deep learning or machine learning. That is, traditional indexes are indexes that do not include a model learned (e.g., using machine learning techniques such as, but not limited to, deep learning) from the underlying data or other characteristic of the database. Traditional indexes may include B-tree index structures. The one or more learned indexes 324 are based on deep learning or machine learning. That is, the learned indexes 324 use respective models that are learned from the underlying data and/or database(s) in order to return a predicted location, in the database, of data items required by a query. Tim Kraska et al., "*Case for Learned Index Structures*", arXiv: 1712.01208 [cs.DB], April 2018, includes a description of learned indexes of types that can be used in embodiments, and also descriptions of some traditional indexes of types that can be used in embodiments. While non-learned indexes such as, for example, B-tree based index perform very efficiently for many types of databases, an advantage of the learned index is that machine learning provides a broad class of models that can match a wide variety of real-world data distributions. This is in contrast to B-Trees for which the lookup time is O(log n) for any data distribution.

Upon receiving a query, the system of FIG. 1, for example, uses the index selector 206 to identify one or more indexes in the set of indexes 126 to be used to respond to the received query, and accordingly selectively uses one or more of the indexes from the set of indexes 126 to access the database 122 and obtain data to be returned in response to the query. The index selector includes an index selection model 318 and a predictor 320. The index selection model 318 is a learned model (e.g., a model created and/or trained using machine learning techniques such as, but not limited to, deep learning) that, given certain characteristics of a query as input, provides a set of weights corresponding to a set of features associated with the query. The predictor 320 selects one of the indexes from the set of indexes 126, based on the output set of weights from the model 318. Further description of the index selector 206 is provided below in relation to FIG. 5.

Description of FIG. 4

FIG. 4 illustrates the index selection model 318 and example interactions between it and the database to be accessed, according to some example embodiments. More particularly, FIG. 4 illustrates interactions of the index selection model 318 with the database 122 and a user interface 402 during training of the index selection model 318.

The index selection model 318 includes a neural network 404. In some embodiments, the neural network 404 may be trained on at least the database 122 and queries. In some embodiments, the neural network 404 may be a multi-layer (e.g. having multiple hidden layers) deep learning neural network, such as, for example, a convolutional neural network (CNN), which receives data features determined based upon a query and the underlying database as input and, as its output, provides a set of values that each represents an importance (significance) of a respective data feature. The output values from the neural network 404 are then compared to one or more predetermined thresholds by another component to select, from the plurality of indexes 126, the index to be used to access database 122.

In some embodiments, the neural network 404 may, as its output, identify one or more of the indexes from the set of indexes 126. That is, instead of producing a set of values to be used by another component to select the index, the neural network 404 itself chooses the index from the plurality of indexes 126.

The neural network 404, more particularly the configuration of the inputs and the outputs of the neural network 404, depend at least on the database 122 and, at least in some embodiments, the queries that are required to be run on the database 122. In some embodiments, the set of data attributes (e.g. data attributes 304 and 312) that can be provided as input to the neural network 404 includes all the data attributes of the database 122. In such an embodiment, when the database consists of one or more tables, the set of data attributes represents all the fields in the one or more tables. In some other embodiments, the set of data attributes that can be provided as input to the neural network 404 is a subset of all the data attributes of the database 122, such as, for example, the set of primary keys or the set of primary keys and secondary keys. The set of data features that can be provided as input may be predetermined, and as noted above, at least in some embodiments include parameters describing the structure and/or distribution of the data in the database.

The input layer of nodes in the neural network 404 may include, for example, a node for each data feature for each data attribute to be considered for input. Specifically, each active node in the input layer accepts a value representing a respective data feature for a respective data attribute. In some embodiments, input nodes may not be configured to receive per data attribute values and may be configured to receive data feature values irrespective of particular data attributes. As known in the art, an initial weight may be provided with each input value. According to some embodiments, the initial weights may be selected randomly, may be based on a predetermined set of weights, or may be dynamically estimated on a per query basis.

The output layer of the neural network, in some embodiments, includes nodes in one-to-one correspondence with the input layer. Thus, for example, in embodiments where an input node exists for each data feature for each data attribute, the output layer has a node corresponding to each data feature for each data attribute. However, in some embodiments, the output layer may include nodes corresponding only to a subset of the input nodes. Each output node provides a numeric value as output.

As noted above, the neural network 404 includes one or more hidden layers of nodes. The number of nodes in the respective hidden layers may be the same or different, and may or may not correspond to the number of nodes in the input layer and output layer. One or more known techniques can be used at each layer as the activation function which determines the output from a node. The hidden layers, by activating/deactivating various paths between the layers from the input layer to the output layer, calculates the set of values to be output from the weighted input values (e.g., the input value multiplied by the corresponding initial weight).

The neural network 404 may be trained using the training components 308 and 316. The training may be based on submitting queries, or more specifically inputs determined from respective queries, through user interface 402 to the neural network 404, and providing feedback regarding the accuracy of the output. The training may be performed in a supervised learning mode or an unsupervised learning mode, and may at least evaluate the output from model 318 based on whether it resulted in the response to the input query satisfying a set of one or more predetermined thresholds related to any of a total response time, data access time, volume of data retrieved from memory, volume of data returned, and the ratio of volume of data retrieved from memory to volume of data returned. The inputs to the neural network 404 may include values determined per query for a set of data features. Example features and associated values are described below in relation to FIG. 6. The machine learning process of the neural network 404 may include determining a derived set of data features 408 for each query based on the structure and/or distribution of data in the corresponding database 122, and adjusting the weights of the inter-node connections among layers of the neural network. The adjustment of the weights based on the derived data features 408 and the comparison of the result to one or more evaluation criteria may be performed by the interpreter calculus module 406 based on back propagation or other feedback processing technique.

Description of FIG. 5

FIG. 5 illustrates an index selector of the database access optimizer shown in FIG. 2, according to some example embodiments. More particularly, FIG. 5 illustrates a flowchart of example process steps performed by the index selector 206 upon receiving a workflow 508 corresponding to a received query.

A received workflow 508, such as, for example, as provided by the read query analyzer 202 may identify a set of data attributes 304 and/or a set of data features 306 derived based on the workflow. Similarly, although not specifically shown in FIG. 5, with respect to a received write query, the write query analyzer 204 may identify a set of data attributes 312 and a set of data features 314 derived from the query as the workflow.

Considering the example of receiving a read query workload 508, at operation 502, some or all of the set of data features 306 are provided as input to the index selection model 318. For example, a subset of the set of data features 306 may be identified and a value for each feature in the subset may be determined. More specifically, an estimated value for each feature in the subset may be provided by the corresponding query analyzer module (e.g. read query analyzer 202, write query analyzer 204) as input to the model 318.

An example set of input data features 602 is shown in table 600 of FIG. 6. The query analyzer provides an estimated value for each of the data features input to the model. For example, the input values 604 may be provided corresponding to the data features 602. As noted above, the input values are weighted according to an initial set of weights which, as described above, can be randomly determined or can be determined in another manner known in the art.

The model 318 then, after processing the input through the multiple layers of the neural network, provides, at operation 504, a second set of data feature values and/or associated weights as output. This output is provided as input to the prediction component 320. An example set of output weights 606 which correspond to the data features 602 is shown in FIG. 6.

The prediction component 320 takes the second set of features and/or the associated weights as input, and outputs the predicted index selection 506. The predicted index selection 506 may be made by the prediction component 320 in accordance with a rule set 510. In some embodiments, the rule set 510 includes one or more rules that compares respective output weights (or groups of them), such as, for example, output weights 606, of the index selection model 318 to one or more thresholds 508. In some embodiments, the rule set 510 is preconfigured and static. In some other embodiments all of the rules or at least some of the rules may be dynamically reconfigured. In some embodiments in which the thresholds 508 and/or rules 510 are reconfigured dynamically, such reconfiguration may be based on values for certain data features determined for a traditional index. That is, the query analysis process may, as part of generating an execution plan, determine certain parameters obtained for some data features as a result of running the query using a traditional index, and configure the determined parameters as a minimum threshold that should preferably satisfied by a learned index if a learned index were to be selected.

Description of FIG. 6

FIG. 6 illustrates a table 600 showing example set of data features 602 representing a set of inputs provided with a particular query to the index selection model, with example input values 604 and example output weights 606 of the respective features.

As described above, the set of features 602 may be provided as input to the index selection model 318 for a particular query. The example set of data features 602 comprise the average chunk size to be retrieved from memory, the standard deviation of the chunks to be retrieved, the number of chunks to be retrieved, the retrieval time, the amount of total data to be retrieved, and a density/sparsity factor of the retrieved chunks. When inputted, the estimated input values 604 may be provided for the respective data features. The input values 604 may be estimated by the query analyzer which submits the query to the index selection model 318.

Some of these data features in the example set 602, such as chunk size, standard deviation and density/sparsity factor, relate to the distribution of data in the database and the ability of an index, such as a learned index, to take advantage of characteristics of the distribution. Rules and thresholds (e.g. rules 510 and thresholds 508) applied for predicting the index to be used, based on such data features, may be preconfigured or manually reconfigured. On the other hand, data features such as the retrieval time and total data retrieved may be also, in addition to being manually reconfigured, be suitable for dynamic reconfiguration by the query analyzer in a manner described above in relation to the prediction component 320 in FIG. 5.

The table 600 also shows output weights 606 which correspond to the respective data features provided as input to the index selection model 318. The output weights 606 represent the output from an index selection model 318. In this illustrated example, the output weights 606 may be interpreted to mean, for example, that for this particular query, the most important aspect for selecting an index is the density/sparsity factor for the chunks expected to be retrieved, followed by the standard deviation of the sizes and the average size of the chunks expected to be retrieved. The weights 606 as illustrated may be taken to mean that the number of chunks, the retrieval time and the total data retrieved are not important to be considered in selecting an index.

Description of FIG. 7

FIG. 7 illustrates an example distribution of a particular data set in a database. The illustrated data distribution (based on https://en.wikipedia.org/wiki/R-tree accessed on Jan. 7, 2021) represents the locations of a certain type of stores throughout the United States. Each store location may be identified in the data by its latitude and longitude coordinates. Each of the rectangles drawn to overlap at least a part of the U.S. represents a "chunk" of the store distribution data. As noted above, some of the learned indexes may use an index based on the chunks.

In a first illustrated data organization represented by the rectangles with thick-lined borders, four rectangles of different sizes are used to cover the entire U.S. The rectangles may have some overlap with each other. The rectangles that cover areas with a higher density of stores are smaller than the rectangles that cover the areas with sparse distribution of the stores. In some embodiments, the first illustrated data organization may be learned. In some embodiments, the first illustrated data organization may be automatically generated by a learned index given, for example, a number of chunks with which to cover the entire U.S., and a goal to minimize the differences in the amount of data in each chunk.

In a second illustrated data organization, represented in FIG. 7 by lighter-colored rectangles, many more chunks than in the first illustrated data organization are required to cover the entire U.S. The respective rectangles, however, may have different sizes. As with the first illustrated data organization, the second data organization too can be either learned or automatically generated.

The ability to dynamically determine characteristics of the structure and/or distribution of data in a database, and to adapt the index accordingly is an advantageous aspect of learned indexes when compared to non-learned indexes. The term "structure" in relation to data in the database, refers to relationships among different data attributes. Learned databases may determine relationships among data attributes beyond any specifically defined relationships by dynamically learning patterns that exist in data in a database as accessed by respective workloads (e.g. queries). The term "distribution" in relation to data in the database, refers to how the data is spread over a certain value-space (e.g., domain and/or range in a two dimensional space).

Description of FIG. 8

FIG. 8 illustrates a process for responding to a query according to some example embodiments. Process 800 may be performed on one or more servers such as, for example, server 113, upon receiving a query from a user or client device 104 to access data stored in DBMS 110. According to some embodiments, the database access optimizer 124 described in relation to inter alia FIG. 2 may comprise process 800.

Process 800, at operation 802, receives a query. The received query may be a read query or a write query. For purposes of this description, it may be assumed that any necessary authentication and/or authorization between the user or client device submitting the query and the server infrastructure, and any authentication or authorization required for process 800 to access the DBMS 110, have already been performed (e.g. using core services 114, etc.), or that it will be performed without being specifically described in this document.

At operation 804, the received query is analyzed to determine one or more data features associated with the query. The analysis may be performed, for example, by read query analyzer 202 or write query analyzer 204 depending on whether the query is a read query or write query. As described above, the analysis includes parsing the query to determine a set of data attributes, and databases and/or database tables to be accessed. Other aspects of the analysis was described above in relation to the query analyzers 202 and 204 shown in FIG. 2 and FIG. 3. As described above in relation to query analyzers 202 and 204, a set of data features is determined for the query. The one or more data features in the set may be determined based on pre configuration and/or by dynamic determination based on the set of data attributes of the query.

At operation 806, estimated values are determined for the determined one or more data features. The values may be determined by the query analyzer 202 or 204, as described above.

At operation 808, an index is selected from the plurality of indexes 126 which includes at least one learned index 322 and at least one non-learned index 324. The selection of the index may be performed as described above in the description of FIG. 5 in relation to the index selector 206.

At operation 810, the database 122 is accessed using selected index 322 or 324. Accessing the database includes retrieving one or more blocks from primary and/or secondary memory in which the desired data is stored. It may be desirable, for efficiency reasons, to retrieve as fewer blocks. Thus, for example, it may be desirable to select a learned index that may be configured for chunks in which the data requested in the query are present in a smaller total number of chunks and/or blocks retrieved. The database may collect performance statistics and the like regarding the received data access requests, and the data accesses, which are subsequently usable for training of the model 318.

At operation 812, the results to the query are transmitted to the client device 104. This operation includes selecting, from the data retrieved, the data requested by the query, and returning the selected data. It may be desirable, in some embodiments, to minimize the amount of data retrieved from memory above and beyond what is required for returning as the response to the query.

Feedback regarding the access to the data in the database in relation to the query may be provided either by the database 122 or may be derived from the results. For example, the feedback may include characteristics of the results such as the total volume of data retrieved from memory and the total volume of data returned as the result, the comparison of which may provide a measure of potentially unnecessary volume of data retrieved. The feedback may alternatively or additionally include the total time to retrieve all the data required for the result. The feedback may be used by the training modules to train the learned index 322 and/or the index selection model 318.

Description of FIG. 9 (FIGS. 9A-9G)

Another example may be described to illustrate the process shown in FIG. 8. FIGS. 9A-9G (collectively referred to as FIG. 9) illustrate aspects of applying process 800 to a publically available dataset of e-commerce data from Brazil released by Olist and made available at https://www.kaggle.com/andresionek/geospatial-analysis-of-brazilian-e-commerce. The data in this data set are sparse and the distribution of the data is skewed across the country. Thus, querying a particular region could result in very irregular query response depending on the query issued. The dataset considered in this example corresponds to 100,000 orders made between 2016 and 2018. Each order has some information about the customer and contains the first three digits of the customer zip code. Olist also released a geolocation database that has 323000 latitude/longitude coordinates related to the first three digits of each zip code. Although this dataset may be much smaller in terms of the size of the data set (e.g. number of orders) and/or the number of attributes of each record, it provides visualizations of the data to show its value for demonstrating the need for advanced indexing techniques such as learned structures such as, for example, Hilbert curve indexing.

For each order, based on its geo location, a zip code prefix, latitude, longitude, city, state, and zip code are available. FIG. 9A illustrates example statistics of the data when aggregated by zip code prefix. In the dataset, there are 19.015 different zip code prefixes. On average there are 52.6 coordinates for each prefix, but there is one prefix with 1.146 coordinates available.

The data set was further processed to remove outlier coordinates in the dataset that are outside of Brazilian territory. This ensures that all coordinates are within a rectangle delimited by the geographic limits of Brazil. Then the latitude and longitude coordinates were transformed to Mercator x/y coordinates for plotting for illustrative purposes. The orders can be mapped based on respective coordinates to yield an image such as that shown in FIG. 9B which shows the geographic distribution of the orders based on their respective coordinates A relationship exists between the zip code prefix and the location of that zip code. As can be observed in FIG. 9B, the pattern starts in Sao Paulo (located roughly in the south east of Brazil), with prefix 01001, and then increases counterclockwise finishing in Rio Grande do Sul (south of Brazil), with prefix 99990.

As described above, there are several indexing strategies that can be used for datasets with a very high or extreme skew. Hilbert space filling curves allow the data to be grouped evenly in a multidimensional sense. An example of building a Hilbert index can be found at https://github.com/davidmoten/rtree.

The Hilbert indexing also has interesting measurable features in that it chunks or blocks the data. The chunk may be a fundamental unit of access according to this technique. An example chunking into rectangles is shown in FIG. 9C. According to some embodiments, features related to this indexing are used to predict latency.

The example dataset was indexed, and a number of example queries were produced. Simple queries involving rectangular swaths over various sparse/dense data areas were considered for the sake of convenient and clear illustration. Features were collected from the query and the corresponding access of the data using the index. Data was collected for various rectangles (chunks) and used to train an index selection model. Feature data was collected from queries on advanced data index (Hilbert index). Some example features that could be used for features of the query and the retrieval of data are shown in FIG. 9D. This table includes examples of elapsed time which is used to train the learned model. The table shows the query execution time in terms of elapsed milliseconds, the number of records found, the number of records read, the hit ratio, the number of bytes read, total time to first byte, average time to first byte, number of chunks read, a query identifier and a type of chunk, as example features. The time to first byte corresponds to the time taken to receive the first byte of the response to the query, and may represent a measure of the efficiency of the selected index. The only type of chunk accessed for this example is a rectangular-shaped chunk.

In the example, prediction based on SVM (support vector machine) and DNN (deep neural network) were made to obtain predictions of the elapsed time for queries including the features shown in FIG. 9D. The SVM prediction for the elapsed time for a query is an efficient and highly accurate technique. FIG. 9E illustrates example computer program code for performing the SVM prediction of the elapsed time for a query. In FIG. 9E, the illustrated code includes a function that outputs the predicted elapsed time of the new query entered with all of its query features, and an SVM that predicts elapsed runtime and then comparison selects index for new query. The comparison selection in this example is by comparing a latency prediction for a system A representing a traditional index represented here with a fixed estimated time and a latency prediction for a system B for which the elapsed time is calculated in the code example. In this example, an optional predetermined multiplier is applied to the estimated latency for a traditional index in order to give the benefit of the doubt to the traditional indexes such as relational indexes which have substantial complexity to adapt to certain types of data organizations and queries. Whereas in the process 800 shown in FIG. 8, the index selected by the index selector (e.g. index selector 206) in operation 808 is then used in step 810 to access the database, in the example shown in FIG. 9E, the comparison selection terminates in merely printing out the result for illustrative purposes.

Training a deep neural network is another method to predict latency given query features. The computer program code shown in FIG. 9F shows an example setting up of example query information for training a model, creating the DNN learning model, and setting up the input function. FIG. 9F also shows example code for training the index selection model and evaluating the index selection model. The computer program code in FIG. 9G shows example code for doing the prediction using the DNN learned model and then choosing between the learned index system (system B) and the traditional indexing system (system A).

A system implementing the process 800 as described in FIG. 8, would proceed to run the query on whichever the index that is the winner of the dynamic comparison selection.

It will be clear to persons of skill in the art, that the system described in relation to FIG. 9 is an example, and embodiments of this disclosure is not limited thereto.

Description of FIG. 10

FIG. 10 schematically illustrates a computer that can be used to implement the system of FIG. 1 and to run the process of FIG. 8, according to some example embodiments. FIG. 10 is a block diagram of an example computing device 1000 (which may also be referred to, for example, as a "computing device," "computer system," or "computing system") according to some embodiments. In some embodiments, the computing device 1000 includes one or more of the following: one or more processors 1002; one or more memory devices 1004; one or more network interface devices 1006; one or more display interfaces 1008; and one or more user input adapters 1010. Additionally, in some embodiments, the computing device 1000 is connected to or includes a display device 1012. As will explained below, these elements (e.g., the processors 1002, memory devices 1004, network interface devices 1006, display interfaces 1008, user input adapters 1010, display device 1012) are hardware devices (for example, electronic circuits or combinations of circuits) that are configured to perform various different functions for the computing device 1000.

In some embodiments, each or any of the processors 1002 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1002 uses an instruction set architecture such as x86 or Advanced RISC Machine (ARM).

In some embodiments, each or any of the memory devices 1004 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1002). Memory devices 1004 are examples of non-volatile computer-readable storage media.

In some embodiments, each or any of the network interface devices 1006 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1008 is or includes one or more circuits that receive data from the processors 1002, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1012, which displays the image data. Alternatively or additionally, in some embodiments, each or any of the display interfaces 1008 is or includes, for example, a video card, video adapter, or graphics processing unit (GPU).

In some embodiments, each or any of the user input adapters 1010 is or includes one or more circuits that receive and process user input data from one or more user input devices (not shown in FIG. 10) that are included in, attached to, or otherwise in communication with the computing device 1000, and that output data based on the received input data to the processors 1002. Alternatively or additionally, in some embodiments each or any of the user input adapters 1010 is or includes, for example, a PS/2 interface, a USB interface, a touchscreen controller, or the like; and/or the user input adapters 1010 facilitates input from user input devices (not shown in FIG. 10) such as, for example, a keyboard, mouse, trackpad, touchscreen, etc.

In some embodiments, the display device 1012 may be a Liquid Crystal Display (LCD) display, Light Emitting Diode (LED) display, or other type of display device. In embodiments where the display device 1012 is a component of the computing device 1000 (e.g., the computing device and the display device are included in a unified housing), the display device 1012 may be a touchscreen display or non-touchscreen display. In embodiments where the display device 1012 is connected to the computing device 1000 (e.g., is external to the computing device 1000 and communicates with the computing device 1000 via a wire and/or via wireless communication technology), the display device 1012 is, for example, an external monitor, projector, television, display screen, etc.

In various embodiments, the computing device 1000 includes one, or two, or three, four, or more of each or any of the above-mentioned elements (e.g., the processors 1002, memory devices 1004, network interface devices 1006, display interfaces 1008, and user input adapters 1010). Alternatively or additionally, in some embodiments, the computing device 1000 includes one or more of: a processing system that includes the processors 1002; a memory or storage system that includes the memory devices 1004; and a network interface system that includes the network interface devices 1006.

The computing device 1000 may be arranged, in various embodiments, in many different ways. As just one example, the computing device 1000 may be arranged such that the processors 1002 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1000 may be arranged such that: the processors 1002 include two, three, four, five, or more multi-core processors; the network interface devices 1006 include a first network interface device that implements Ethernet and a second network interface device that implements WiFi and/or Bluetooth; and the memory devices 1004 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the server infrastructure 102, client applications 118 and 120, web application 112, DBMS 110, access optimizer 124, set of indexes 126, etc., each of which will be referred to individually for clarity as a "component" for the remainder of this paragraph, are implemented using an example of the computing device 1000 of FIG. 10. In such embodiments, the following applies for each component: (a) the elements of the computing device 1000 shown in FIG. 10 (i.e., the one or more processors 1002, one or more memory devices 1004, one or more network interface devices 1006, one or more display interfaces 1008, and one or more user input adapters 1010), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1004 (e.g., in various embodiments, in a volatile memory device such as a RAM or an instruction register and/or in a non-volatile memory device such as a flash memory or hard disk) and all actions described herein as performed by the software modules are performed by the processors 1002 in conjunction with, as appropriate, the other elements in and/or connected to the computing device 1000 (i.e., the network interface devices 1006, display interfaces 1008, user input adapters 1010, and/or display device 1012); (c) alternatively or additionally, to the extent it is described herein that the component processes and/or otherwise handles data, in some embodiments, such data is stored in the memory devices 1004 (e.g., in some embodiments, in a volatile memory device such as a RAM and/or in a non-volatile memory device such as a flash memory or hard disk) and/or is processed/handled by the processors 1002 in conjunction, as appropriate, the other elements in and/or connected to the computing device 1000 (i.e., the network interface devices 1006, display interfaces 1008, user input adapters 1010, and/or display device 1012); (d) alternatively or additionally, in some embodiments, the memory devices 1002 store instructions that, when executed by the processors 1002, cause the processors 1002 to perform, in conjunction with, as appropriate, the other elements in and/or connected to the computing device 1000 (i.e., the memory devices 1004, network interface devices 1006, display interfaces 1008, user input adapters 1010, and/or display device 1012), each or any combination of actions described herein as performed by the component and/or by any software modules described herein as included within the component.

The hardware configurations shown in FIG. 10 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 10, (e) via other hardware arrangements, architectures, and configurations, and/or via combinations of the technology described in (a) through (e).

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

Additional Applications of Described Subject Matter

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Technical Advantages of Described Subject Matter

Certain example embodiments may provide improved application execution times and better throughput for applications by more efficiently accessing databases in response to queries. The improved efficiencies in database access are due to reduced times to access and retrieve the relevant content and/or reduced use of memory transport bandwidth in retrieving the relevant content compared to conventional techniques.

Certain embodiments provide a single or unified database access mechanism that leverages the advantages of both, conventional indexes (e.g. B-tree, etc.) and learned indexes, dynamically and in real-time, depending on the specific characteristics of a query and the data to be accessed by the query. Thus, such embodiments provide a technical approach to overcome the technical problem of degraded system efficiency (and therefore system capacity) caused by the use of non-optimal indexes for database access.

Additionally, certain embodiments combine deep learning inference and rule-based techniques to select the index to be used on a per-query basis. For example, as described in relation to FIG. 5 above, whereas in some example embodiments the optimal set of data features or a subset thereof for a particular query may be determined using deep learning inference in the index selection model, based on the outputs of the index selection model, a rule-based technique may be used to predict the optimal index to be used for that particular query. In some instances, this combined technique provides for reduced training time for the deep learning model, thus providing for faster adapting of the index selection to changes in the data in the database when compared to systems that are entirely deep learning or entirely rule-based.

The example embodiments described above concerned an electronic data access system that provides for securities and/or document analysis and which may be operated in connection with an electronic trading system. However, it should be noted that embodiments are not limited to data access systems associated with securities and/or document analysis. Embodiments can be advantageously used in any system in which indexes are used.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

As used herein, the term "configured to" requires that the processor(s) (and/or other components) is/are configured by program code to perform the recited activity. The term, when used in claim language, requires such configuration, and is thus reciting an actual state of configuration of the processor (and/or other components) so configured. The actual state of configuration fundamentally ties the action recited following the "configured to" phrase to the physical characteristics of the processor(s) (and/or other components) recited before the "configured to" phrase.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. An electronic data access system, comprising:
one or more memory devices comprising
a plurality of indexes for accessing data stored in a database, the plurality of indexes including at least one non-learned index that is formed and maintained without using machine learning and at least one learned index that is created or maintained using machine learning; and
a server infrastructure comprising at least one processor configured to perform operations that comprise:
receiving a query;
identifying one or more data features of at least a portion of said data that is associated with the query;
determining, based at least on (i) a characteristic of the query or (ii) a characteristic of the data, estimated values for the one or more data features;
selecting, using an index selection model and the one or more determined estimated values, an index from the plurality of indexes;
accessing the database using the selected index; and
outputting results for the query, based at least on portions of the data obtained by the accessing.

2. The electronic data access system according to claim 1, wherein the selecting the index comprises:
providing the identified one or more data features and the determined corresponding estimated values as input to the index selection model;
identifying, using the index selection model and based at least on the provided input, an index from the plurality of indexes,
wherein the identified index is used as the selected index in said accessing the database.

3. The electronic data access system according to claim 2, wherein the identifying comprises:
obtaining, in response to providing the input to the index selection model, one or more output values from the index selection model;
comparing the one or more output values to one or more threshold values; and
identifying the index based at least on the comparing.

4. The electronic data access system according to claim 3, wherein the one or more threshold values include at least one threshold value that is dynamically determined based at least on the data.

5. The electronic data access system according to claim 4, wherein the one or more threshold values include at least one threshold value that is dynamically reconfigured based at least on the received query.

6. The electronic data access system according to claim 2, wherein the at least one processor is further configured to perform operations comprising training the index selection model based at least on the received query and/or results from said accessing the database.

7. The electronic data access system according to claim 1, wherein the at least one processor is further configured to perform operations comprising, upon the at least one learned index being the selected index, predicting, using the selected index, a location in the database of a key for data to be accessed by the received query.

8. The electronic data access system according to claim 7, wherein the at least one processor is further configured to perform operations comprising training the selected learned index based at least on the received query and/or results from said accessing the database.

9. The electronic data access system according to claim 1, wherein the one or more data features include at least one data feature which characterizes data in the database in terms of data distribution density levels of one or more selected attributes of the data, and wherein the selecting an index is based at least on the determined estimated value of the data distribution density levels.

10. The electronic data access system according to claim 1, wherein the at least one learned index automatically, based at least on machine learning, groups data into a respective plurality of chunks for each of a plurality of attributes of the data, and indexes the chunks, and
wherein the one or more data features include at least one of:
an average data per chunk for one of more of said attributes,
standard deviation of data in chunks for one or more of said attributes,
a variance of data in chunks for one or more of said attributes,
a retrieval time of said results for one or more of said attributes,
a retrieval rate of said results for one or more of said attributes,
a total amount of data scanned for one or more of said attributes, and
a sparsity and/or density factor for one or more of said attributes.

11. The electronic data access system according to claim 1, wherein the one or more data features include at least one preconfigured data feature and at least one derived data feature that is derived automatically by a learning system based at least on the data in the database.

12. The electronic data access system according to claim 11, wherein the learning system includes a neural network that is trained on a plurality of queries including data store queries and data load queries.

13. The electronic data access system according to claim 1, wherein said selecting the index comprises comparing the one or more of the determined estimated values to one or more threshold values.

14. A method for accessing a database having a plurality of indexes the method, performed by one or more processors in a server infrastructure, comprising:
receiving a query for accessing data stored in the database, the plurality of indexes including at least one learned index that is created or maintained using machine learning and at least one non-learned index that is formed and maintained without using machine learning;
identifying one or more data features of at least a portion of said data that is associated with the query;
determining, based at least on (i) a characteristic of the query or (ii) a characteristic of the data, estimated values for the one or more data features;
selecting, using an index selection model and the one or more determined estimated values, an index from the plurality of indexes;
accessing the database using the selected index; and
outputting results for the query, based on portions of the data obtained by the accessing.

15. The method according to claim 14, wherein the selecting an index comprises:
providing the identified one or more data features and the determined corresponding estimated values as input to the index selection model;

identifying, using the index selection model and based on the provided input, an index,
wherein the identified index is used as the selected index in said accessing the database.

16. The method according to claim 15, wherein the identifying comprises:
obtaining, in response to providing the input to the index selection model, one or more output values from the index selection model;
comparing the one or more output values to one or more threshold values; and
identifying the index based on the comparing.

17. A non-transitory computer-readable storage medium having stored therein a program comprising instructions, that when executed by one or more processors of a server infrastructure, causes the server infrastructure to perform operations comprising:
receiving a query for accessing a database using a plurality of indexes for accessing data stored in the database, wherein the plurality of indexes includes at least one learned index that is created or maintained using machine learning and at least one non-learned index that is formed and maintained without using machine learning;
identifying one or more data features of at least a portion of said data that is associated with the query;
determining, based at least on (i) a characteristic of the query or (ii) a characteristic of the data, estimated values for the one or more data features;
selecting, using an index selection model and the one or more determined estimated values, an index from the plurality of indexes;
accessing the database using the selected index; and
outputting results for the query, based on portions of the data obtained by the accessing.

18. The non-transitory computer-readable storage medium according to claim 17, wherein the selecting an index comprises:
providing the identified one or more data features and the determined corresponding estimated values as input to the index selection model;
identifying, using the index selection model and based on the provided input, an index,
wherein the identified index is used as the selected index in said accessing the database.

19. The non-transitory computer-readable storage medium according to claim 18, wherein the identifying comprises:
obtaining, in response to providing the input to the index selection model, one or more output values from the index selection model;
comparing the one or more output values to one or more threshold values; and
identifying the index based on the comparing.

20. The non-transitory computer-readable storage medium according to claim 17, wherein the at least one learned index automatically, based on machine learning, groups data into a respective plurality of chunks for each of a plurality of attributes of the data, and indexes the chunks, and
wherein the one or more data features include at least one of:
an average data per chunk for one of more of said attributes,
standard deviation of data in chunks for one or more of said attributes,
a variance of data in chunks for one or more of said attributes,
a retrieval time of said results for one or more of said attributes,
a retrieval rate of said results for one or more of said attributes,
a total amount of data scanned for one or more of said attributes, and
a sparsity and/or density factor for one or more of said attributes.

* * * * *